United States Patent [19]

Hokanson et al.

[11] Patent Number: 5,030,898
[45] Date of Patent: Jul. 9, 1991

[54] VARIABLE VOLTAGE LIMIT CONTROL FOR AN ELECTRIC PROPULSION SYSTEM

[75] Inventors: Paul R. Hokanson, Girard; Edward S. Matulevich, Erie, both of Pa.

[73] Assignee: General Electric Company, Erie, Pa.

[21] Appl. No.: 501,460

[22] Filed: Mar. 30, 1990

[51] Int. Cl.$^5$ .......................... H02P 5/26; B60L 11/02
[52] U.S. Cl. ...................... 318/146; 318/144; 318/145
[58] Field of Search ..................... 318/98, 99, 139, 140, 318/141, 143, 144, 145, 146, 151, 153, 154, 158, 430, 432, 433, 434

[56] References Cited

U.S. PATENT DOCUMENTS

| | | | |
|---|---|---|---|
| 3,798,520 | 3/1974 | Friend et al. | 318/158 X |
| 3,953,775 | 4/1976 | Friend et al. | 318/158 X |
| 3,965,403 | 6/1976 | Okado | 318/143 |
| 4,461,958 | 7/1984 | Kronhling et al. | 318/99 X |
| 4,482,813 | 11/1984 | Grand-Perret et al. | 318/140 X |

Primary Examiner—Bentsu Ro
Attorney, Agent, or Firm—A. S. Richardson; R. T. Payne

[57] ABSTRACT

Method and apparatus for optimizing power delivered by a prime mover-driven electric power alternator to an adjustable speed electric traction motor during high speed operation. The alternator is suitably controlled to deliver constant power if its output voltage does not exceed a first predetermined magnitude corresponding to a "corner point" speed of the motor and to limit the voltage magnitude when motor speed exceeds this corner point, thereby preventing excitation current from exceeding the maximum continuous field current rating of the alternator. As motor speed increases above corner point speed, less power is delivered to the motor, but the power reduction is minimized by increasing the voltage limit above the first predetermined magnitude. The amount of voltage limit increases, up to a predetermined maximum amount, is proportional to the amount load current in the motor decreases below its magnitude when motor speed equals corner point speed. Concurrently with this voltage limit increases, the ratio of motor field current magnitude to load current is reduced, thereby weakening the motor field which enables the motor to run at its maximum allowable speed without exceeding the motor commutation limit whenever the predetermined maximum amount of voltage limit increase is obtained.

16 Claims, 3 Drawing Sheets

VARIABLE VOLTAGE LIMIT CONTROL FOR AN ELECTRIC PROPULSION SYSTEM

BACKGROUND OF THE INVENTION

This invention relates generally to electric propulsion systems for traction vehicles and, more particularly, to a method and apparatus for enhancing motive power output of electrically powered traction vehicles at high propulsion speeds.

An electric propulsion system for a traction vehicle, such as a large haulage truck, typically comprises a prime mover-driven electric generating means for supplying electric power to an electrical load comprising a pair of high-horsepower electric traction motors respectively connected in driving relationship to a pair of wheels on opposite sides of the vehicle. The prime mover is commonly a diesel engine, the generating means typically comprises a large alternator, the alternating current (AC) output terminals of which are connected to a power rectifying bridge, and the traction motors are generally adjustable speed, reversible direct current (DC) electric motors. A vehicle operator controls the vehicle speed and direction of travel, i.e., forward or reverse, by manipulation of a speed control pedal and a forward-reverse selector switch. This speed control pedal is adapted to control the engine speed (RPM) which determines the power output of the alternator, thus varying the magnitude of the voltage applied to the traction motors. In the propulsion or "motoring" mode of operation, the rotational speed of the motors (and hence the linear speed of the vehicle) is primarily dependent on both the magnitude of the alternator output voltage and the strength of the motor field. Separately excited motors are commonly used, with their field excitation being so controlled that the magnitude of motor field current is a predetermined function of the magnitude of armature current, thereby emulating the desirable characteristics of DC motors with series fields.

In the motoring mode of operation of a traction vehicle propulsion system, motor speed can vary over a wide range. Near the low end of the allowable speed range, the back EMF of each traction motor will be relatively low, armature current will be high, and therefore the motors can develop the high torque needed when a vehicle carrying a heavy payload is accelerating from rest or ascending a steep incline. Conversely, when motor speed is high (as will be true when a loaded vehicle is traveling on a nearly level roadway or when the vehicle is empty), back EMF will be high while load current (and hence torque) will be relatively low. Throughout the speed range, the magnitude of voltage that the alternator applies, via the rectifying bridge, to the armature windings of the motors will depend on the engine speed, the strength of the alternator field, and the magnitude of current that the alternator supplies to the armature windings, whereas the load current magnitude will depend on the motor torque demand.

Such a propulsion system characteristically has three different operating regions for any given engine speed: a current limit region at relatively low motor speeds, i.e., when the magnitude of load current is high; a constant horsepower (HP) region as motor speed varies through an intermediate portion of the full range of allowable speed variations; and a voltage limit region at speeds above the intermediate region and below maximum allowable speed, i.e., when load current magnitude is low.

Many interdependent variables are involved in sizing the various components of an electric propulsion system on board a large haulage truck. Because of weight and space constraints, it is not practical to use an alternator large enough to deliver to the traction motors, over the full range of allowable motor speeds (RPM) in the motoring mode of operation, 100% of the maximum rated power that the engine is capable of producing. Such a propulsion system is typically designed and controlled for 100% power utilization so long as the alternator output voltage is not higher than a certain magnitude (which is lower than the alternator's maximum allowable voltage) and for less than 100% power utilization otherwise. When the alternator voltage just equals such magnitude, the speed of each traction motor will be equal to a certain "corner point" speed. Corner point speed is the highest motor speed at which the alternator can safely supply the motors with a quantity of electrical power equivalent to the maximum rated mechanical power of the engine (less inherent losses). When motor speed exceeds this corner point speed, the alternator cannot deliver such equivalent power without the current in its field windings being increased above the maximum continuous field current rating of this machine. Corner point speed is lower than the maximum allowable motor speed which is established by physical or structural limitations in the traction motors. The physical sizes of the alternator and the motors are generally proportional to the product of the maximum rated power of the engine and the motor speed range over which maximum power can be continuously utilized without exceeding predetermined operating limits of the alternator and motors. For any given corner point speed and maximum allowable speed, the measure of performance for an electric propulsion system becomes the percentage of maximum rated power obtainable at maximum speed of the traction motors.

FIG. 1 illustrates an exemplary torque versus speed characteristic of a pair of serially connected DC traction motors, to which the rectified output voltage of an alternator is applied. The maximum allowable speed for this particular motor, determined by mechanical design limitations, is about 2320 shaft revolutions per minute. As motor speed varies in an intermediate portion of the full speed range, i.e., from about 300 RPM to about 1300 RPM, the propulsion system will operate in its constant power region to maintain motor horsepower at a desired constant limit which will be assumed equal to the maximum rated power available from the engine that is driving the alternator. This is illustrated in FIG. 1 by the solid-line curve between points O and A, it being understood that power is proportional to the product of speed and torque. Point A marks the corner point speed. To maintain the same power at higher motor speeds, current in the alternator field would have to exceed its maximum continuous rating. A phantom curve from point A to a point B illustrates a constant power continuation of the 0 to A curve for motor speeds between the corner point speed and the maximum allowable speed. In practice, however, the voltage limit region of operation becomes effective as motor speed increases above the corner point A, and motor horsepower will decrease instead of following a constant HP curve. This is illustrated by the solid-line curve between points A and C for a prior art propulsion system wherein the magnitude of alternator field current is reduced from its maximum rating in order to maintain the alternator output voltage at the magnitude it attained as motor speed increased to the corner point A. The vertical difference between the solid line from points A to C and the phantom line from points A to B represents an undesirably large reduction in motive power. To minimize the power reduction when the motor speed is above corner point speed and to utilize a higher percentage of maximum rated power at maximum allowable motor speed, a characteristic between these two lines, as illustrated in FIG. 1 by a broken-line curve between points A and D, would be desirable if it could be obtained without the alternator field current exceeding its maximum continuous rating and without motor armature current increasing above a predetermined commutation limit (which is proportional to the product of motor speed and armature current magnitude) and without violating either the maximum output voltage limit of the alternator or the minimum excitation limit of the motors (below which commutation degrades to an unacceptable level). These limits define the high speed range of operation of the conventional traction vehicle propulsion system. Power delivered to the traction motors at maximum motor speed would be optimized if alternator output voltage reached its maximum limit and motor armature current equaled its commutation limit concurrently with motor speed attaining its maximum allowable speed. The higher the power delivered to the motors at maximum speed, the steeper the grade that a loaded vehicle can ascend at a corresponding high speed, and consequently the greater the productivity of the vehicle.

SUMMARY OF THE INVENTION

It is a general object of the present invention to provide a method and apparatus in a propulsion system for an electrically propelled traction vehicle for minimizing reductions in motive power during high speed operation without increasing the size or cost of the propulsion system.

The present invention is useful in an electrical propulsion system of a wheeled vehicle. The system typically includes an adjustable speed electric traction motor (e.g., a separately excited DC motor) mechanically coupled in driving relationship to a wheel of the vehicle, a controllable source of electric power (e.g., a diesel engine-driven alternator plus an uncontrolled rectifying bridge) electrically coupled in an energizing relationship to armature windings of the motor, and a controllable source of excitation current (e.g., a phase-controlled rectifying bridge energized from an auxiliary winding of the alternator) for the motor field windings. Means are provided for deriving feedback signals representative of the source voltage, the motor armature current, and the motor field current, respectively. The system includes control means responsive to the voltage and armature current feedback signals for controlling the power source in a manner such that a desired constant amount of power will be supplied to the traction motor as motor speed varies so long as the motor speed does not exceed a predetermined corner point speed and the magnitude of load current is less than a desired current limit. When motor speed exceeds the corner point speed, the power control means is operative to prevent the magnitude of source voltage from being greater than a desired voltage limit, thereby reducing the quantity of power that the power source supplies to the motor at the high end of the allowable range of motor speed variations. The system further includes field control means responsive to the armature and field current feedback signals for controlling the excitation current source in a manner such that the motor field current will vary as a predetermined function of armature current, the motor field strength being determined by the ratio of field current to armature current magnitudes.

In accordance with the present invention, the aforesaid voltage limit is not a fixed value but is varied as a function of the magnitude of motor armature current. The desired voltage limit has a predetermined initial magnitude which equals the magnitude of source voltage when the motor is being supplied with maximum rated power and its speed equals the corner point speed. At this point, armature current has a predetermined threshold magnitude. As motor speed increases from the corner point, armature current will decrease from the aforesaid threshold magnitude to a lower magnitude determined by the motor's commutation limit at maximum allowable motor speed, and the desired voltage limit is increased from its initial magnitude. The amount that the voltage limit increases above its initial magnitude, up to a predetermined maximum amount, is proportional to the amount armature current decreases below the first-mentioned threshold magnitude thereof, whereby the voltage limit increase is obtained without overheating the power source, i.e., without exceeding the thermal limit of the alternator field windings. As a result of increasing the desired voltage limit in this manner, the reduction in power supplied to the motor at high speed is significantly smaller than would be true if the voltage limit were kept fixed at its initial magnitude. To obtain maximum motor speed concurrently with the aforesaid lower magnitude of armature current (thereby optimizing power utilization at maximum motor speed), the motor field strength is appropriately reduced. For this purpose, the motor field control means is so programmed that as armature current decreases below the first-mentioned threshold magnitude (indicating that motor speed is increasing above corner point speed), the ratio of field current to load current magnitudes is progressively reduced, whereby the motor field strength is weaker when armature current equals the aforesaid lower magnitude.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 2:
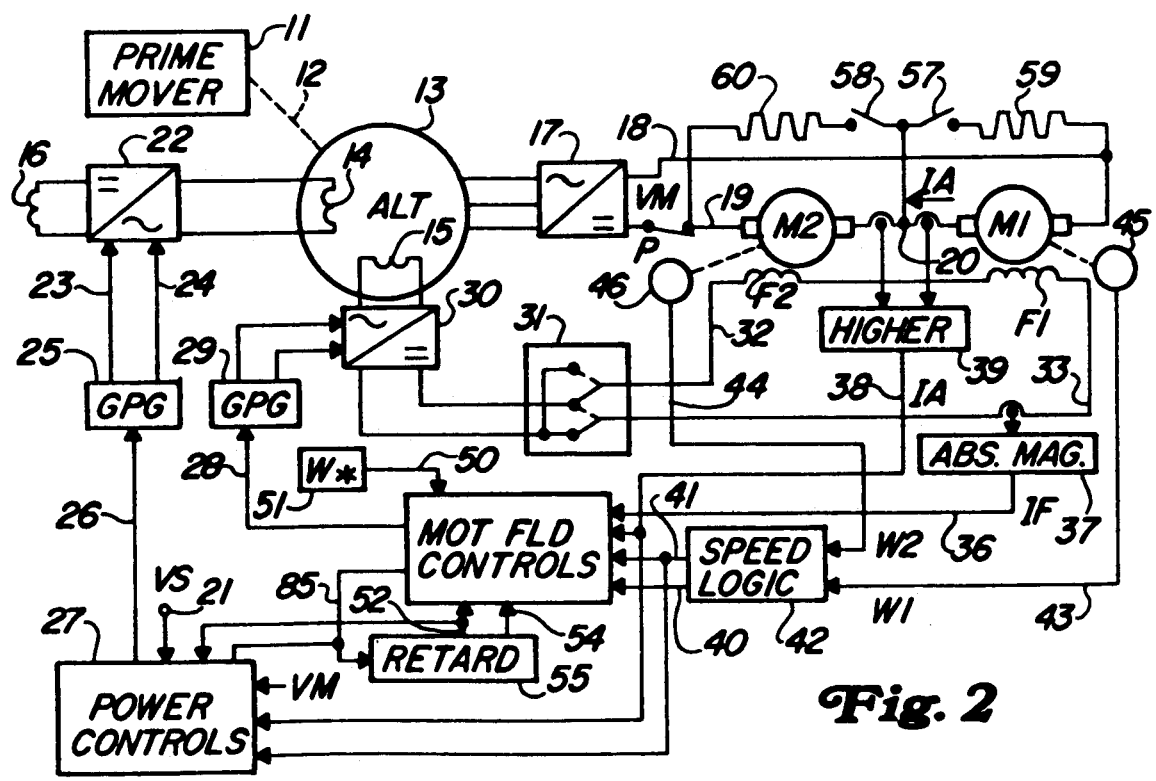
FIG. 2 is a functional block diagram of an exemplary dual motor electric propulsion system for an electric traction vehicle.

The electric propulsion system that is shown in FIG. 2 is intended to be physically located on a self-propelled traction vehicle (not shown) such as a large off-highway haulage truck. An operator-controlled throttle, e.g., a foot pedal (not shown) is adapted to control the rotational speed (revolutions per minute) of a prime mover 11 which may, for example, be a diesel engine. Hereinafter it is assumed, unless otherwise noted, that the operator is calling for maximum rated engine speed. The output shaft 12 of the engine is drivingly coupled to the rotor of an alternating current (a-c) electric power generator 13, herein referred to as an alternator, which has a set of 3-phase armature or main windings (not shown), a pair of auxiliary (tertiary) windings 14 and 15, and field windings 16. The 3-phase generally sinusoidal alternating voltage that is generated in the main windings of the alternator 13 is converted to direct voltage by means of an uncontrolled full-wave rectifying bridge 17. The prime mover-driven alternator serves as a controllable source of energization for a pair of adjustable speed DC traction motors M1 and M2 whose respective armature windings are connected, via a connector P and lines 18, 19, and 20, in series with one another between the output terminals of the rectifying bridge 17. Motors M1 and M2 have separately excited field windings F1 and F2, respectively. The rotors of these motors are respectively coupled in driving relationship, through suitable speed-reduction gearing, to separate wheels (not shown) on opposite sides of the vehicle. By suitably controlling the speed of the engine 11 and the excitation of the alternator and motor fields, the vehicle can be propelled (also known as "motoring") or dynamically retarded (also known as "electrical retarding") by its motors in either a forward or reverse direction.

During the motoring mode of operation, the motors M1 and M2 will each rotate at a speed that primarily depends on both the magnitude of excitation current in their fields F1, F2 and the magnitude of the voltage applied to their respective armature windings. The latter magnitude is a function of the speed at which the alternator 13 is driven, the amount of load current, and the magnitude of excitation current in the alternator field 16. So long as engine speed is constant (assumed), the average magnitude of the rectified output voltage of the alternator 13 is varied by controlling alternator field excitation current. The alternator field current is supplied by the auxiliary winding 14 of the alternator 13 via a single-phase, full-wave "phase controlled" rectifying bridge 22. Its magnitude depends on the timing of periodic firing signals that are supplied to the rectifier 22 over lines 23 and 24 from a conventional gate pulse generator 25 which is connected to an output line 26 of associated power control means 27.

The power control means 27 receives a first input signal representative of the voltage VM at the output of the rectifying bridge 17, a second input signal representative of the current in the electrical load connected to this bridge, i.e., the current IA in the armature windings of the motors M1 and M2, a third input signal (from a terminal 21) that varies with the rotational speed VS of the engine 11, and the other inputs shown in FIG. 2. In the motoring mode, this control means is effective to produce on line 26 an output signal having a value normally representative of any magnitude error between a power feedback signal which is proportional to the product of VM and IA and a load reference signal which varies as a function of engine speed. The load reference signal limits the alternator power output while the engine 11 is accelerating from idle speed to the assumed maximum rated speed and also serves to reduce power output if the engine 11 becomes overloaded and starts to "bog" or slow. In the event of relatively high magnitudes of VM, IA, or motor speed, an overriding feedback signal proportional to the appropriate one of these parameters is substituted for the power feedback signal, and during the dynamic retarding mode of operation a preselected constant reference signal is substituted for the aforesaid load reference signal. The output signal on line 26 controls the operation of the gate pulse generator 25 and thereby determines the magnitude of current in the field 16. As a result, the alternator field excitation is controlled in a manner to regulate load voltage to a value to obtain desired vehicle performance.

The illustrated propulsion system includes motor field control means (labeled "MOT FLD CONTROLS") for producing an independently variable control signal on an output line 28 which is connected to a conventional gate pulse generator 29. This generator supplies periodic firing signals to another single-phase, full-wave phase controlled rectifying bridge 30 connected between the second auxiliary winding 15 of the alternator 13 and the fields F1 and F2 of the motors M1 and M2. The two motor fields are connected in series with each other to the direct voltage output of the rectifier 30 via lines 32 and 33 and a polarity reversing switch 31. Thus, the auxiliary winding 15, the rectifier 30, and the associated gate pulse generator 29 comprise a separately controllable source of excitation current for the motor fields F1 and F2. This current has a variable average magnitude, and its direction in the motor fields depends on the position of the reversing switch 31. With the switch in its solid line position, current flows from left to right through the field windings F2 and F1 as viewed in FIG. 1, and the motors rotate in a clockwise direction. On the other hand, with the switch 31 in its broken line position, current flows from right to left through the field windings and the motors rotate in the opposite or counterclockwise direction.

The average magnitude of excitation current in the series-connected field windings F1 and F2 will depend on the value of the control signal that is supplied to the gate pulse generator 29 over the output line 28 of the motor field control means. The motor field control means receives input signals on seven different lines 36, 38, 40, 41, 50, 52, and 54, respectively. The input on line 36 is a field current signal having a value that varies with the average absolute magnitude (IF) of excitation current in the motor field windings F1 and F2. To derive this signal, the line 36 is coupled to a conventional current transducer in line 33 via suitable means 37 for converting the bipolarity output of the current transducer to a unipolarity voltage signal, on line 36, representative of IF. More particularly, the electric potential on line 36, measured with respect to a predetermined reference potential, e.g., ground, has a magnitude proportional to the number of amperes flowing in line 33, and its polarity does not change regardless of whether the polarity of the transducer output signal is positive or negative with respect to ground.

The signal on the second input line 38 has a value that varies with the average magnitude of motor load current. To obtain this signal, the line 38 is coupled via a higher magnitude selector 39 to a pair of current transducers which are respectively located in the connections from the line 20 to the motors M1 and M2. These transducers monitor electric currents in the armature windings of the pair of traction motors M1 and M2 that drive the first and second wheels of the vehicle, and they derive feedback signals representative, respectively, of the average magnitudes of such currents. As a result, the signal on the line 38 is actually representative of the higher average magnitude of load current IA in the two motors.

The signals on the third and fourth input lines 40 and 41 are speed feedback signals representative, respectively, of the actual rotational speeds of the slower motor and the faster motor. These signals are provided by a speed logic means 42 which, in turn, is coupled via lines 43 and 44 to a pair of conventional speed sensors 45 and 46 that are respectively associated with the rotors of the two motors M1 and M2. The output of the speed sensor 45 is a signal W1 whose value varies with the angular velocity of the rotor of motor M1, and the output of the speed sensor 46 is a signal W2 whose value varies with the angular velocity of the rotor of motor M2. Since each motor rotor is mechanically coupled in driving relationship to a vehicle wheel, these signals are also representative, respectively, of the rotational speeds of the first and second driven wheels. Preferably, each of the signals W1 and W2 is actually a train of discrete pulses of constant amplitude and duration but having a variable frequency directly proportional to the speed of the associated wheel, which speed can be expressed either as revolutions per unit of time or as linear speed, e.g., miles per hour, at the perimeter of the tire on the wheel. It will now be apparent that the value of the faster motor feedback signal W> on line 41 is normally representative of the actual speed of the vehicle.

The fifth input line 50 originates at a block 51 which represents suitable means for providing a speed reference signal W* of desired value, and the sixth and seventh input lines 52 and 54 to the motor field control means originate at a retard command block 55. The latter block represents manually controlled means for producing on line 52 a predetermined command signal when dynamic retarding of the vehicle is desired and for providing on line 54 a retarding signal having a value which depends on the degree of dynamic retarding that the operator of the vehicle desires. The command signal is produced as a result of either the operator depressing the vehicle retard foot pedal (not shown) or motor speed increasing above an overspeed set point. In response to this event, the motor field controls will switch from a motoring mode of operation, wherein the value of the control signal on line 28 is representative of any difference or error between IF and a reference magnitude which varies as a predetermined function of IA, to a retarding mode, wherein the control signal value is representative of any error between IF and a retard reference magnitude which, within limits that are predetermined functions of IA and actual motor speed, is normally determined by the retarding signal on line 54. At the same time, conventional actuating means (not shown) closes a pair of contactors 57 and 58 in unison, thereby connecting a first braking resistor grid 59 between lines 18 and 20 and concurrently connecting a second braking resistor grid 60 between lines 19 and 20.

These resistor grids are used to dissipate the electric power output of the respective motors M1 and M2 which behave as generators during the dynamic retarding mode of operation.

The magnitude of excitation current IF in the motor field windings depends on the value of the control signal on the output line 28 of the motor field control means. In the motoring mode of operation, the control signal value is increased or decreased as necessary to reduce to zero any error between IF and a reference magnitude that is a predetermined function of the magnitude of motor armature current IA. Suitable means is provided for "programming" this function so that the slope of the relationship between IF and IA, and hence the relative strength of the magnetic fields exciting the traction motors, is not the same at all magnitudes of IA. In other words, the ratio of IF to IA is not the same when IA is relatively high as when IA is low. The desired relationships between motor field current and armature current will be described hereinafter with reference to FIG. 5.

Figure 3:
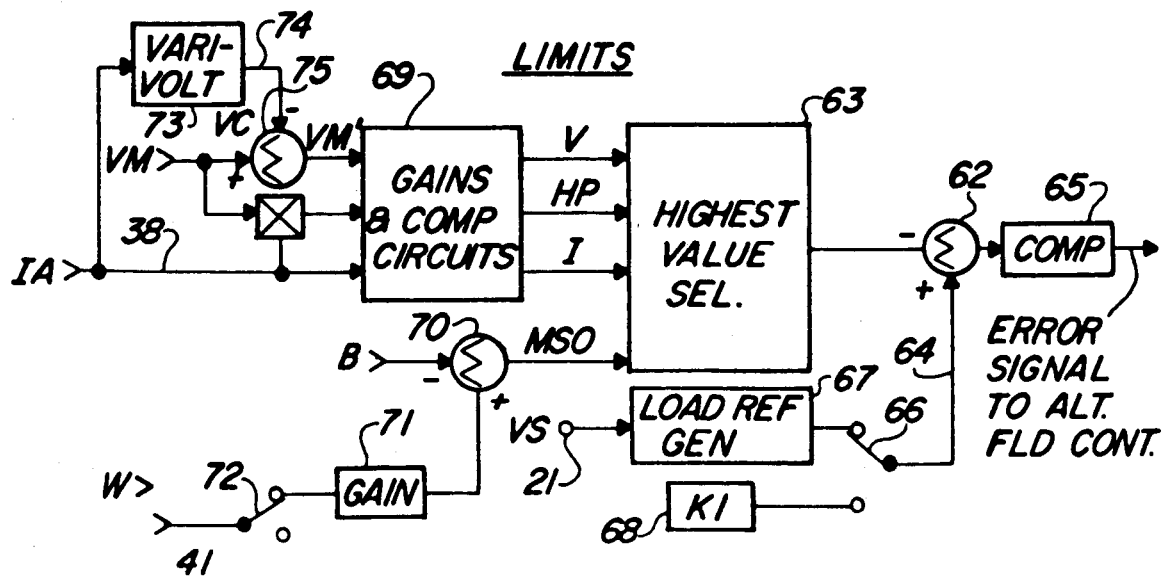
FIG. 3 is a block diagram of the power controls block of FIG. 2.

Certain parts of the above-summarized power control means 27 are shown in simplified form in FIG. 3, including summing means 62 where a limit value output of a highest positive value selector 63 is subtracted from a load reference value on a line 64. The difference between the summed values is modified as desired by compensation means 65 and serves as an error signal input for alternator field current control. If the highest limit value were less than the load reference value on the line 64, the alternator field controller (not shown) would increase the electrical output of the main alternator 13 as necessary to minimize the resulting difference. During the motoring mode of operation, the line 64 is connected by bistable switching means 66 to a load reference generator 67 which in turn is connected to the terminal 21 so that the reference value is now determined by the engine speed VS, whereas during dynamic retarding this line is alternatively connected by the switching means 66 to a source 68 of preselected constant value K1. The highest value selector 63 has four inputs: a voltage limit value V; a current limit value I; a power limit value HP; and a motor speed override limit value MSO. The first three of these inputs are derived from a block 69 representing desired gains and conventional compensation circuits, and they are determined, respectively, by VM, IA, and the product thereof.

The highest value selector 63 receives its fourth limit value MSO from summing means 70 having first and second inputs respectively representative of the actual motor speed and a set speed "B" that is determined by the desired minimum speed at which MSO will be high enough to influence the error signal value derived by the summing means 62. MSO therefore comprises the algebraic sum of the values of these two inputs. The first input value is proportional to the value of a motor speed feedback signal W> on a line 41. The summing means 70 is coupled to the line 41 via a block 71 which represents a desired gain and a switch 72 which is closed only in the motoring mode. The second input value, which the summing means 70 subtracts from the first input value, corresponds to the set speed B which typically is slightly lower than the maximum allowable speed of the traction motors. A relatively high gain 71 is selected so that the speed override limit MSO will rise to a sufficiently high value, whenever the motor speed has increased to the overspeed set point from the aforesaid minimum speed, to reduce the error signal from the summing means 62 to zero even though the load reference value on the line 64 is high.

Figure 1:
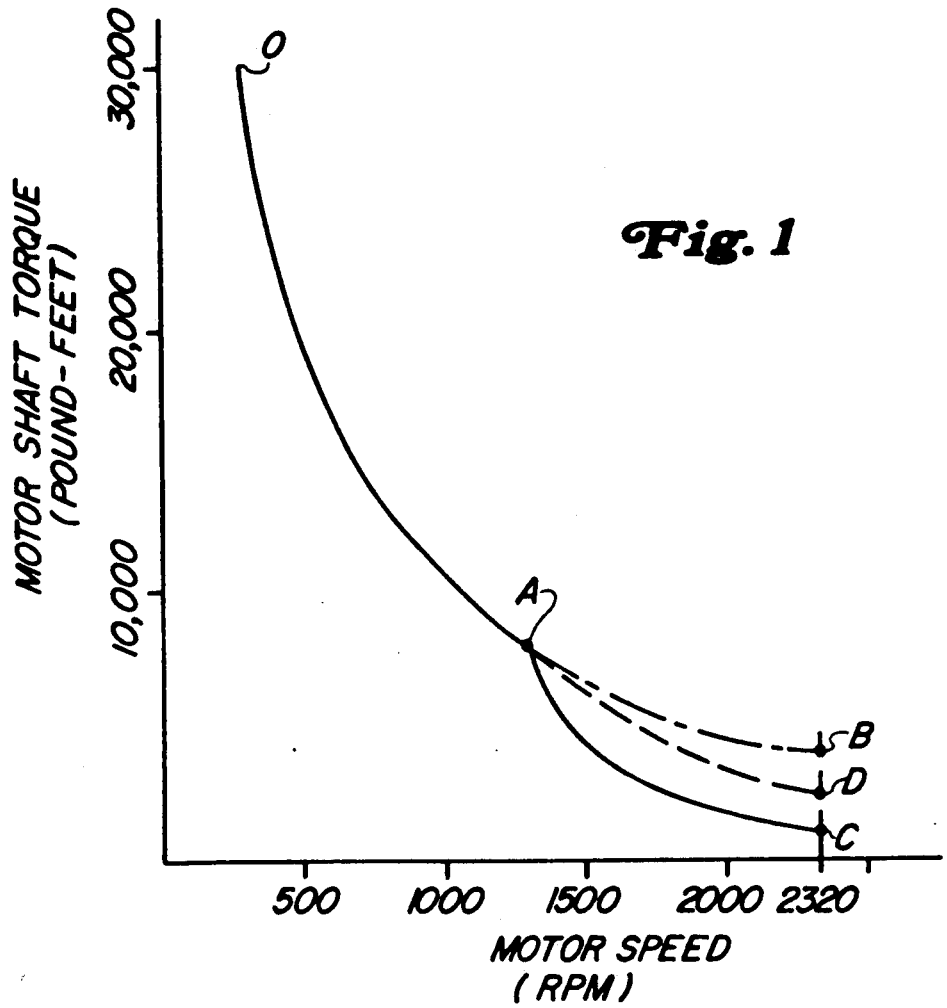
FIG. 1 illustrates an exemplary torque versus speed characteristic for a pair of serially connected DC traction motors.

The solid-line torque-speed curve of FIG. 1 from its origin 0 to point C illustrates an operating characteristic typical of a vehicle propulsion system as thus far described in FIGS. 2-3. In order to improve the performance of the system at high motor speed, i.e., to increase the power utilization, it is desirable to raise the torque-speed curve to approximate as nearly as practical the constant HP characteristic from point A to point B, such as along the line from point A to point D in FIG. 1. We achieve this desirable result without increasing the physical size or exceeding the operating limitations of the propulsion system by allowing the desired voltage limit to increase in proportion to the difference between IA and a predetermined threshold magnitude (K2) when motor speed exceeds the corner point speed, while concurrently reducing the motor field strength (FS). Toward this end and still referring to FIG. 3, the load current feedback signal on the line 38 is coupled to a variable voltage compensation circuit 73 ("vari-volt") which produces on its output line 74 a compensation signal representative of a bias voltage VC proportional to the amount load current IA is lower than the threshold magnitude. This compensation signal is subtracted, at summing means 75, from a voltage feedback signal representative of the rectified alternator output voltage VM applied to the motor load, and the resultant signal from the summing means 75 is representative of a voltage VM' equal to VM−VC. The latter signal is coupled to the gain and compensation circuit 69, and it determines the voltage limit value V that is one of the four inputs to the highest value selector 63. No compensation signal is provided on the line 74, i.e., VC=0, unless the magnitude of actual load current IA is under the aforesaid threshold. The threshold magnitude K2 is selected to equal the magnitude of load current with 100% power utilization and with motor speed just equal to the corner point speed. Within the constant power region of operation, IA exceeds this threshold, and VC=0. But when the system is operating in its voltage limit region, i.e., when motor speed is over the corner point, IA is under the threshold and the compensation signal is produced. At this time, the error signal to the alternator field controller will cause the alternator field current to have whatever magnitude is necessary to minimize the difference between the voltage limit value V and the load reference value on the line 64. Because the voltage limit value V is determined by the difference between VM and VC, the output voltage VM is able to increase to a higher level than was heretofore true in the voltage limit region for a given load reference value (assumed constant). The amount of increase is equal to the variable bias voltage VC. The compensation signal on the line 74 will increase with decreasing IA (below the threshold K2) until it attains a predetermined maximum value corresponding to VC=K3, and the compensation circuit 73 is suitably arranged to prevent the compensation signal from increasing above this magnitude if IA decreases further. So long as the compensation signal is clamped at its maximum value, the regulating action of the illustrated power control will prevent further increases in the magnitude of output voltage VM.

Figure 4:
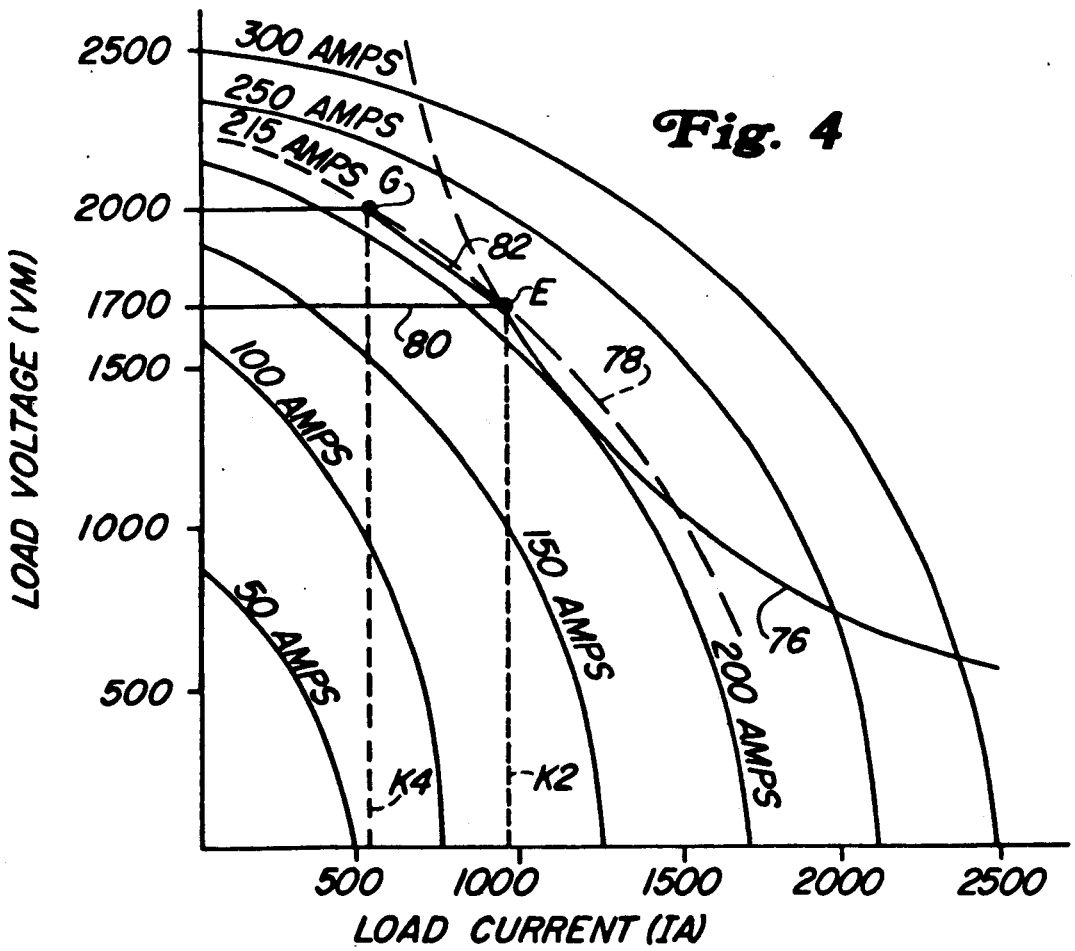
FIG. 4 illustrates an exemplary alternator load current versus alternator load voltage characteristic as a function of alternator field current with a superimposed alternator voltage-current curve for constant power operation at maximum rated power output.

Referring to FIG. 4, there is shown a set of curves that illustrate exemplary relationships between the average magnitude of load voltage and the average magnitude of load current at the output terminals of the rectifying bridge 17 as supplied by a typical alternator 13 driven at constant speed, e.g., 1900 RPM, by the engine 11 and excited by alternator field current of various different magnitudes which are labeled on the respective curves. Superimposed on these curves in FIG. 4 is another curve 76 illustrating the load voltage-current magnitude relationship that is needed for constant power operation at the maximum rated power output of the typical alternator. For this particular alternator, the maximum continuous field current rating is 215 amps and is indicated by the curve 78. However, higher field current can be tolerated for short time periods and is necessary for best performance at vehicle start-up when load current is relatively high. For example, the alternator requires field current of about 325 amperes to generate 2500 amps of load current at 600 volts. In order to achieve operation along the constant power curve 76, the power control means will cause the alternator field current to vary from about 325 amps at start-up to about 200 amps as the speed of each traction motor approaches its corner point (see point A in FIG. 1). At the intersection E of the two curves 76 and 78 in FIG. 4, the actual magnitude of alternator field current equals the maximum continuous field rating of 215 amps, load voltage and current have the indicated magnitudes, and the corner point speed is attained. As motor speed increases above corner point speed, the alternator cannot continue to deliver the same amount of power, i.e., the amount represented by curve 76 in FIG. 4, without its field current increasing above 215 amps. Excessive field current on a continuous basis would overheat the field windings and damage the alternator. As explained hereinbefore, this problem has heretofore been avoided by imposing a fixed limit on the alternator output voltage, thereby preventing the maximum load voltage from exceeding an upper corner point (UCP) magnitude which is attained at the intersection point E. Such a fixed voltage limit is indicated by a line 80 in FIG. 4, and it results in the deviation from the constant power curve in FIG. 1 as shown by the line from point A to point C.

In accordance with the present invention, the desired higher power utilization at high motor speed is achieved by allowing the alternator voltage to increase above the UCP limit it attains when motor speed just equals corner point speed and by reducing or weakening the motor field strength. FIG. 4 illustrates load voltage VM increasing along a line 82 from point E to a higher magnitude at a second upper corner point G while the alternator field current stays equal to or less than its maximum continuous rating. The higher UCP magnitude is equal to or less than the alternator's maximum output voltage limit. For the illustrated example, the desired voltage limit is increased from a first UCP of about 1700 volts to a second, higher UCP of about 2000 volts. The difference (K3) between these first and second voltage limit magnitudes is 300 volts which is equally shared by the two motors M1 and M2. FIG. 4 also illustrates load current IA decreasing along the line 82 from a first threshold magnitude (K2) of nearly 1000 amps at point E to a second, lower threshold magnitude (K4) of about 530 amps at point G.

Figure 5:
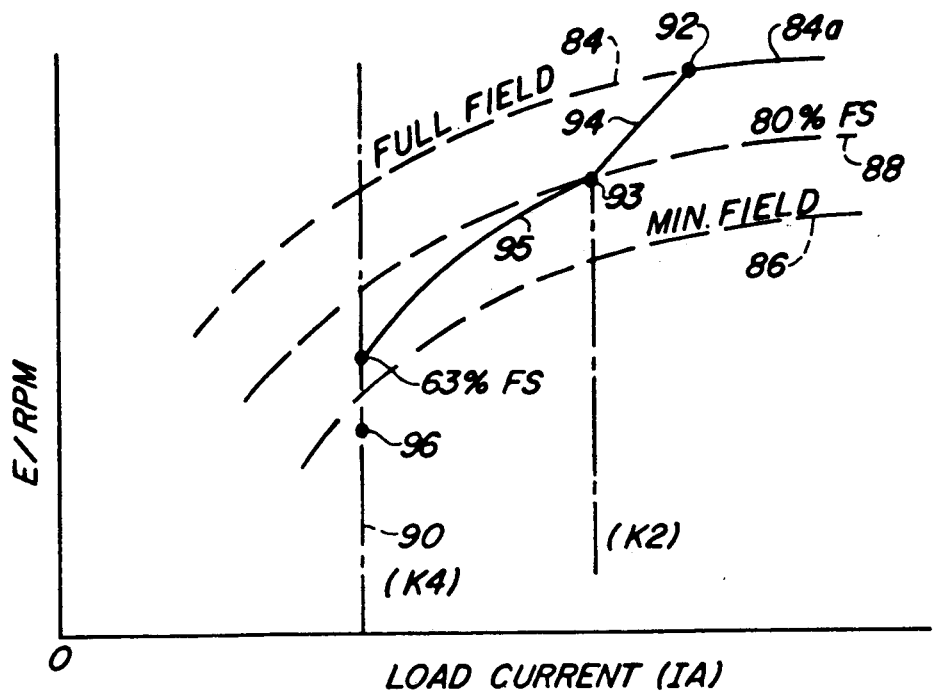
FIG. 5 illustrates an exemplary load saturation characteristic plotted as a function of load current versus E/RPM for a separately excited DC electric traction motor.

The advantage of increasing the voltage limit can be appreciated by comparing the difference in the amounts of power delivered to the two series connected traction motors M1, M2 at 1700 and 2000 volts, respectively. Before making this comparison, reference is made to FIG. 5 which illustrates the load saturation characteristic of a typical separately excited DC electric traction motor which might be used in practice. In FIG. 5, motor armature current IA (load current) is plotted as a function of the per motor ratio of armature counter EMF to angular velocity (E/RPM). The upper curve 84 represents the relationship between these variables with full (100%) motor field strength (FS). The lower curve 86 represents their relationship with minimum FS, i.e., the motor field excitation below which commutation becomes unsatisfactory. A typical minimum field strength is about 57%. The broken-line middle curve 88 corresponds to a typical weak but safe FS at the first UCP magnitude of the alternator output voltage VM (point E in FIG. 4) and may be about 80% of full FS. The vertical line 90 indicates the highest magnitude that IA can have without exceeding the motor commutation limit when the motor is operating at its maximum allowable speed. Preferably, the line 90 coincides with the second threshold magnitude K4 of load current IA and defines the second UCP magnitude of voltage VM (point G in FIG. 4). The motor normally begins operation at the far right-hand side of the solid line portion 84a of curve 84, i.e., at high current magnitude and full field strength. As motor speed and counter EMF (counter-electromotive force) increase, IA decreases, a desired constant ratio of field current magnitude to armature current magnitude (IF/IA) is initially maintained in the motor, and the relationship between E/RPM and IA is as indicated by the solid line 84a. As IA decreases from a certain point 92 on the line 84a to a lower magnitude indicated by a point 93 in FIG. 5, the motor field strength is progressively weakened by reducing IF/IA from its constant, full field ratio to a lower ratio which is a given fraction, e.g., 0.8, thereof, and the relationship between E/RPM and IA will now be as indicated by a line 94 interconnecting the two points 92 and 93. The point 93 corresponds to the motor speed corner point (see point A in FIG. 1) and to the first UCP magnitude of load voltage (see point E in FIG. 4). At its breakpoint 92, IA has a magnitude, e.g., about 1150 amps, which will allow motor field strength to change at a desired constant rate from 100% FS at point 92 to the lower given FS, e.g., 80% FS, at point 93. The 80% FS used in the present example might be different for a different design of motor. As each traction motor accelerates from the corner point speed to its maximum allowable speed, IA continues to decrease. In accordance with the present invention, as IA decreases from point 93 to the maximum speed commutation limit indicated by the vertical line 90 in FIG. 5, e.g., about 530 amps, the motor field is further weakened (but at a lesser rate than was the case as IA decreased from points 92 to 93) by progressively reducing IF/IA to a new ratio which is an even smaller predetermined fraction of the full field ratio. The new IF/IA ratio is selected so that when IA equals its commutation limit, the weakened field will have a predetermined strength, e.g., approximately 63% FS, appreciably lower than the given FS at point 93 but not lower than the aforesaid minimum field strength (curve 86). The relationship between E/RPM and IA from point 93 to line 90 is as indicated by a line 95 in FIG. 5.

In prior art propulsion systems, when motor speed increases above the corner point speed and IA decreases below its magnitude at point 93 in FIG. 5, the motor field strength is generally held constant (tracking the broken-line curve 88) and the alternator output voltage is clamped at a fixed limit, e.g., 1700 volts If the constant field strength were 80% and the fixed limit of voltage were 850 volts per motor, motor speed would only reach about 1635 RPM at IA=530 amps. In order to follow the 80% FS characteristic to maximum allowable motor speed, IA would have to decrease to about 330 amps and the motor would develop much less torque. Furthermore, it can be shown that reducing field strength to obtain maximum motor speed at 850 volts would result in an FS below the minimum acceptable weak field excitation of 57%. Point 96 represents the field strength (about 45%) at which maximum speed could be obtained at 850 volts and 530 amps.

In order to understand the effects of the above-described limits, consider a diesel engine 11 delivering 2350 net horsepower to the alternator 13, a pair of DC traction motors operating at 80% field strength with a maximum allowable speed of 2320 RPM, and a prior art electric propulsion system which will hold 80% FS and enable the motors to develop maximum speed at IA equal to about 330 amps. The maximum power that the alternator delivers to both motors at maximum speed is proportional to the product of 1700 volts and 330 amps, or about 561 kilowatts (KW). If the voltage were raised to 2000 volts, or about 1000 volts per motor for the two series connected motors, and if IA were increased to its commutation limit of 530 amps at maximum speed, this speed can be attained at a 63% FS (above the minimum allowable weak field excitation) resulting in power output of 2000×530 or about 1060 KW, nearly twice the power utilization of the prior art system.

If desired, power utilization could be increased by merely increasing the alternator voltage limit and not changing field strength. For example, for 80% FS and 2000 volts, it can be shown that maximum motor speed is attainable at 390 amps, resulting in a power output of 2000×390 or 780 KW, an increase of 40% over the prior art system. If the motor field strength were reduced while keeping the voltage limit fixed at 1700 volts, maximum motor speed could not be attained at 530 amps because the field strength would have to be reduced below the minimum limit of 57%. For example, for motors having the characteristic shown in FIG. 5, maximum speed at 530 amps would require a field strength of about 45%. Since this field strength is less than the minimum weak field excitation of 57%, field strength is not permitted to be reduced this much. Maximum speed with a fixed voltage limit and minimum field strength will produce only a 33% increase in power output over the prior art system with 80% field strength.

Referring again to FIGS. 2-3, an alternator field regulator within power control means 27 responds to the error signal from compensation means 65 to vary the magnitude of voltage VM as necessary to minimize this error. The error signal reflects the difference between the load reference value (assumed constant) on line 64 and the highest one of four limit values V, HP, I, and MSO. Whenever motor speed exceeds the corner point speed and does not exceed the aforesaid set speed B, the limit value V will be higher than the other three. Now the system operates in its voltage limit region so that VM does not exceed a desired limit determined by the load reference value. In the example shown in FIG. 4 and discussed above, the desired limit is 1700 volts when the actual motor speed equals the corner point speed, and the gain that relates the magnitude of VM to the voltage limit value V is selected so that V just equals the load reference value when VM=1700. If V were determined solely by the magnitude of VM, as is true in prior art propulsion systems of the kind herein disclosed, VM would be maintained at this same limit through the voltage limit region. However, the present invention utilizes the "vari-volt" compensation circuit 73 to derive a load current dependent compensation signal that is subtracted from the load voltage feedback signal in the manner previously explained, whereby VM can increase to a desired limit that is not fixed but increases as motor speed increases above the corner point without causing the limit value V to increase above the load reference value. This increasing voltage limit desirably increases the percentage of maximum rated power that is delivered to the traction motors at speeds approaching the maximum allowable motor speed. While it has been herein assumed, to facilitate the description of the present invention, that the voltage limit region of operation is in effect through the range of motor speed variations between corner point speed and maximum speed, in practice if the aforesaid set speed B were lower than maximum speed, the magnitude of alternator output voltage would not attain its higher UCP limit (VM=2000) at maximum motor speed and would actually be reduced to zero by the action of the motor speed override limit value MSO.

Figure 6:
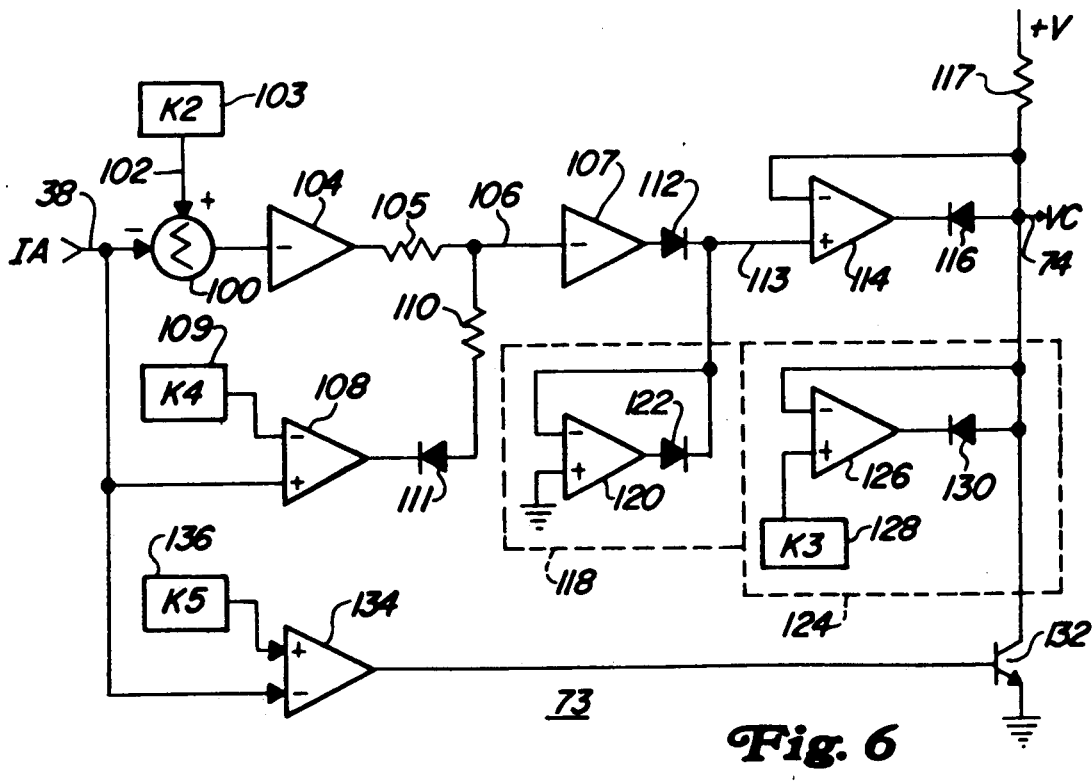
FIG. 6 is a simplified schematic representation of one form of variable voltage ("vari-volt") compensation circuit shown in block diagram form in FIG. 3.

One form of variable voltage compensation circuit 73 is shown in a simplified schematic representation in FIG. 6. The various passive components generally required in such circuits, such as biasing and coupling resistors and capacitors, are well known to those skilled in the art and have been omitted to simplify the description. The input signal on line 38, representative of motor load current IA, is coupled to summing means 100 where it is subtracted from another signal on a line 102. The signal on the line 102 is derived from suitable means 103, and it has a predetermined constant magnitude corresponding to the aforesaid threshold magnitude K2 of IA. The resultant signal from the summing means 100 therefore has a magnitude proportional to the difference between IA and K2 and a sign that is negative whenever IA is greater than K2 and positive whenever IA is less than K2. This signal is applied to an inverting amplifier 104, and an output terminal of amplifier 104 is coupled via a resistor 105 and a line 106 to the input terminal of another inverting amplifier 107. The current feedback signal on the line 38 is also coupled to a first input of an amplifier 108. Suitable means 109 is provided for supplying the second input of the amplifier 108 with a signal of predetermined constant magnitude corresponding to a second threshold magnitude K4 of the load current IA. K4 is lower than K2. The amplifier 108 has a positive output so long as IA is greater than K4, and its output will become negative in response to IA decreasing to K4. The output of the amplifier 108 is coupled to the line 106 via a resistor 110 and a diode 111 which is poled to conduct only if this output is negative.

The amplified, inverted difference signal from the summing means 100 is inverted again by the second amplifier 107 and fed through an isolating diode 112 to a line 113. The line 113 is connected to a non-inverting input terminal of an amplifier 114. The output terminal of amplifier 114 is coupled through a diode 116 to the output line 74 on which the compensation signal representative of the bias voltage VC is produced. A resistor 117 interconnects the output line 74 and a control power bus +V of relatively positive constant voltage. So long as the diode 116 is in a conducting state, the value of the compensation signal on line 74 will be determined by the output value of the amplifier 114. A zero output voltage clamp circuit 118 is connected to the line 113 for ensuring that the input of amplifier 114 is clamped at a reference potential, e.g., zero volts, whenever the resultant signal from the summing means 100 is negative, i.e., whenever IA is higher than K2. The clamp circuit 118 comprises an inverting amplifier 120 having a non-inverting input terminal connected to the reference potential line, e.g., ground, an inverting input terminal connected directly to the line 113, and an output terminal connected to the same line 113 through a diode 122 which is in a non-conducting or blocking state whenever the voltage on line 113 is positive with respect to ground. Consequently, a compensation signal can be provided on the line 74 only when IA is less than K2, and in this event, the magnitude of the compensation signal tracks the amount of difference between IA and K2.

In order to limit the excursion of the compensation signal to a predetermined maximum value, a maximum value clamp circuit 124 is connected to the output line 74 of the compensation circuit 73. The clamp circuit 124 comprises an inverting amplifier 126 having a non-inverting input terminal connected to suitable means 128 for providing a signal of predetermined constant value corresponding to the desired maximum magnitude K3 of the variable bias voltage VC, an inverting input terminal connected directly to the line 74, and an output terminal connected to the same line 74 through a diode 130. Whenever the positive output value of the amplifier 114 is lower than the predetermined constant value of the signal provided by the means 128, i.e., whenever VC is less than K3, the diode 130 is in a non-conducting or blocking state; otherwise, the diode 130 is conducting, the diode 116 is in a blocking state, the value of the compensation signal on line 74 is determined by the constant output value of the amplifier 126, and VC will remain equal to K3. In effect, the diodes 116 and 130 form a least value selector circuit which selects as the compensation signal the lower one of the positive output values of the respective amplifiers 114 and 126. The output of amplifier 114 attains the predetermined value that initiates the above-described clamping action when IA is a certain amount lower than K2. The aforesaid second threshold magnitude K4 is selected to be substantially equal to K2 minus this certain amount. Thus, IA will decrease to K4 at virtually the same time the clamping action of circuit 124 becomes effective. As a result of IA decreasing to K4, the output of the amplifier 108 changes from positive to negative, the diode 111 changes from blocking to conducting states, a large negative signal is applied to the input of the inverting amplifier 107, the output of the latter amplifier is driven to its saturation (maximum) level, and the output of the amplifier 114 rises abruptly to a value well above the predetermined value that initiated the clamping action. This step increase of the output value of amplifier 114 assures that the diode 116 is definitely in a blocking state, thereby "latching in" the maximum value clamping circuit.

In order to disable the compensation circuit 73 during dynamic retarding, an NPN transistor switch 132 is connected between line 74 and ground. A control terminal of the transistor switch 132 is connected to the output of a bistable comparator 134. Suitable means 136 is provided for supplying a first input of the comparator 134 with a signal of predetermined constant positive value corresponding to a third, relatively low threshold magnitude K5 of the load current IA. K5 is lower than K4. The feedback signal representing IA is coupled to the other input of this comparator. If IA is positive and lower than K5, or if IA is negative (as is true during dynamic retarding), the comparator 134 will be in a first state in which its output is high or "1", and consequently the transistor switch 132 will be gated into conduction. So long as the switch 132 is conducting or "turned on", the line 74 is at ground potential and there is no compensation signal, i.e., VC=0. However, if IA is positive and higher than K5 (as is true during the motoring mode of operation), the comparator 134 will be in a low or "0" output state, whereby the switch 132 is not conducting.

In summary, the above-described "vari-volt" function is effective when the propulsion system is operating in its voltage limit region to provide a variable bias voltage VC that allows the desired limit of source voltage VM to increase, from its first UCP magnitude (point E in FIG. 4) to a higher UCP magnitude (point G in FIG. 4), in proportion to the amount load current IA decreases below its threshold magnitude K2 (point E in FIG. 4 and point 93 in FIG. 5). As previously explained, this desirably increases the percentage of maximum rated power that the alternator will deliver to the traction motors when motor speed exceeds the corner point speed, compared to the prior art system in which the voltage limit is fixed at the first UCP magnitude. To optimize the amount of power delivered to the motors when VM equals its higher UCP magnitude, the motor field control means is arranged to so vary the ration of IF to IA that the motor field strength changes from a given FS when IA=K2 (at point 93 in FIG. 5) to a predetermined weaker FS when IA equals its second, lower threshold magnitude K4 (the line 90 in FIG. 5) established by the motor commutation limit at maximum allowable motor speed. As a result, the motors will attain their maximum speed concurrently with the source voltage attaining its higher UCP magnitude.

While the principles of the invention have now been made clear in an illustrative embodiment, it will be apparent to those skilled in the art that many modifications of the circuits, arrangements, and components presented in the above illustrations may be made in the practice of the invention in order to develop alternative embodiments suitable to specific operating requirements without departing from the spirit and scope of the invention as set forth in the claims which follow.

What is claimed is:

1. A method for increasing traction power utilized by a wheeled traction vehicle when traveling at high speed, the vehicle having an electrical propulsion system including at least one adjustable speed electric traction motor mechanically coupled in driving relationship to a wheel of the vehicle, a controllable source of electric power the output of which is electrically coupled in an energizing relationship to the motor, means for providing feedback signals representative respectively of source voltage and motor load current, and control means responsive to the feedback signals for controlling the power source in a manner such that a desired constant amount of power will be supplied to the traction motor as motor speed varies so long as the motor speed does not exceed a predetermined corner point speed and the magnitude of load current is less than a desired current limit and such that the magnitude of source voltage will not be greater than a desired voltage limit when motor speed exceeds the corner point speed, the method comprising the steps of:

varying the desired voltage limit as a function of the magnitude of load current if load current is lower than a predetermined threshold magnitude so that the voltage limit will increase above a first predetermined magnitude in proportion to the amount load current decreases below said threshold magnitude; and preventing the desired voltage limit from increasing above a second predetermined magnitude which is higher than said first magnitude.

2. The method of claim 1 for a propulsion system the electric power source of which comprises a prime mover-driven alternator whose voltage output is varied by controlling the magnitude of alternator field current, wherein the voltage limit varying step includes controlling the alternator field current so that the magnitude of source voltage will track the varying voltage limit without alternator field current exceeding its maximum continuous current rating.

3. The method of claim 1 wherein said threshold magnitude is the magnitude of load current when motor speed equals the corner point speed.

4. The method of claim 3 wherein the desired voltage limit is increased by subtracting from the voltage feedback signal a compensation signal proportional to the difference between load current magnitude and said threshold magnitude when load current is lower.

5. The method of claim 3 wherein said second, higher desired voltage limit is reached when load current decreases to a magnitude equal to the commutation limit of the traction motor at maximum allowable motor speed.

6. For use in an electrical propulsion system of a wheeled vehicle, which system comprises at least one adjustable speed electric traction motor adapted to be mechanically coupled in driving relationship to a wheel on the vehicle, a controllable electric power source connected to supply electric power to the traction motor, means for deriving voltage and current feedback signals representative respectively of source voltage and motor load current, and control means responsive to the feedback signals for controlling the power source in a manner such that a desired constant amount of power will be supplied to the traction motor as motor speed varies so long as the motor speed does not exceed a predetermined corner point speed and the magnitude of load current is less than a desired current limit and such that the magnitude of source voltage will not be greater than a desired voltage limit when motor speed exceeds the corner point speed, the improvement comprising additional means responsive to the load current feedback signal for automatically varying the desired voltage limit as a function of the magnitude of load current if load current is lower than a predetermined threshold magnitude.

7. The improvement of claim 6 for use in a propulsion system, the traction motor of which has separately excited field windings connected to a controllable source of excitation current, the system including means for deriving a second current feedback signal representative of motor field current and means responsive to both current feedback signals for controlling the excitation current source in a manner such that the magnitude of motor field current will vary as a predetermined function of the magnitude of load current, the motor field strength being determined by the ratio of field current to load current magnitudes, wherein the ratio of field current to load current magnitudes is reduced as load current decreases below said predetermined threshold magnitude.

8. The improvement of claim 6 wherein said additional means is effective to vary said voltage limit between a first predetermined magnitude and a higher predetermined magnitude, with the amount of variation above said first magnitude being proportional to the amount load current decreases below said predetermined threshold magnitude.

9. The improvement of claim 8 for use in a propulsion system, the traction motor of which has a predetermined maximum allowable speed that is higher than the corner point speed and a predetermined commutation limit that establishes a load current limit when the motor is operating at maximum speed, wherein said threshold magnitude is the magnitude of load current when motor speed equals corner point speed and is higher than the load current limit established by the motor commutation limit at maximum speed, wherein said first predetermined voltage limit magnitude is the magnitude of source voltage when motor speed equals corner point speed, and wherein said higher predetermined magnitude is the magnitude of source voltage when motor speed is maximum and load current equals said last-mentioned load current limit.

10. The improvement of claim 8 for use in a propulsion system in which the power source comprises a prime mover-driven alternator and excitation means that supplies the alternator field windings with current of variable magnitude determined by the power control means, wherein said first predetermined voltage limit magnitude equals the highest magnitude of source voltage that the alternator can generate when its field current equals the maximum continuous field current rating of the alternator and when it is supplying said desired constant power to the traction motor.

11. The improvement of claim 8 wherein said additional means is effective to prevent said voltage limit from increasing above said higher predetermined magnitude.

12. The improvement of claim 8 wherein said additional means comprises means for producing a compensation signal proportional to the amount load current is lower than said threshold magnitude and means for subtracting said compensation signal from the voltage feedback signal to derive a difference value which is used by the control means in performing its voltage limit function when motor speed exceeds the corner point speed.

13. The improvement of claim 12 wherein said compensation signal producing means is effective to prevent the value of said compensation signal from increasing above a predetermined maximum value corresponding to the difference between said first and higher predetermined magnitudes of said voltage limit.

14. The improvement of claim 13 wherein said compensation signal producing means includes first means for deriving a first value that varies with the amount load current is lower than said predetermined threshold magnitude, second means for providing a second value that is the same as said predetermined maximum value, and third means for selecting as said compensation signal the lower one of said first and second values.

15. The improvement of claim 14 wherein said compensation signal producing means also includes means associated with said first means for effecting a step increase of a first voltage in response to load current decreasing to a predetermined second threshold magnitude which is lower than its first-mentioned threshold magnitude.

16. The improvement of claim 14 wherein said compensation signal producing means also includes means for ensuring that the value of said compensation signal is zero whenever load current is higher than its first-mentioned threshold magnitude.

* * * * *